United States Patent
Ge et al.

(10) Patent No.: US 9,140,908 B2
(45) Date of Patent: *Sep. 22, 2015

(54) SILICONE HYDROGEL CONTACT LENSES

(75) Inventors: Junhao Ge, Fremont, CA (US); Yuwen Liu, Dublin, CA (US); Charlie Chen, San Ramon, CA (US); Yuan Xu, Fremont, CA (US); Ye Hong, Pleasanton, CA (US); Hongjin Qiu, Mountain House, CA (US)

(73) Assignee: CooperVision International Holding Company, LP, St. Michael (BB)

( * ) Notice: Subject to any disclaimer, the term of this patent is extended or adjusted under 35 U.S.C. 154(b) by 183 days.

This patent is subject to a terminal disclaimer.

(21) Appl. No.: 13/982,032

(22) PCT Filed: Feb. 23, 2012

(86) PCT No.: PCT/US2012/026226
§ 371 (c)(1),
(2), (4) Date: Sep. 30, 2013

(87) PCT Pub. No.: WO2012/118683
PCT Pub. Date: Sep. 7, 2012

(65) Prior Publication Data
US 2014/0016085 A1    Jan. 16, 2014

Related U.S. Application Data

(60) Provisional application No. 61/447,216, filed on Feb. 28, 2011.

(51) Int. Cl.
*G02C 7/04* (2006.01)
*G02B 1/04* (2006.01)

(52) U.S. Cl.
CPC ............... *G02C 7/049* (2013.01); *G02B 1/043* (2013.01)

(58) Field of Classification Search
CPC ......... G02B 1/043; C08L 83/04; C08L 83/06; G02C 7/04
USPC ........................................................ 523/107
See application file for complete search history.

(56) References Cited

U.S. PATENT DOCUMENTS

| | | | |
|---|---|---|---|
| 6,310,116 B1 | 10/2001 | Yasuda et al. | |
| 7,572,841 B2 | 8/2009 | Chen et al. | |
| 8,425,926 B2 | 4/2013 | Qiu et al. | |
| 2005/0218536 A1 | 10/2005 | Quinn et al. | |
| 2014/0009735 A1* | 1/2014 | Zheng et al. | 351/159.33 |
| 2014/0049746 A1* | 2/2014 | Liu et al. | 351/159.33 |

FOREIGN PATENT DOCUMENTS

| CN | 1096352 C | 12/2002 |
|---|---|---|
| CN | 1822867 A | 8/2006 |
| WO | 2005014074 A1 | 2/2005 |

OTHER PUBLICATIONS

International Search Report and Written Opinion issued in corresponding International Patent Application No. PCT/US2012/026226 dated Jun. 4, 2012 (14 pages).
Written Opinion of the International Preliminary Examining Authority issued in corresponding International Patent Application No. PCT/US2012/026226 dated Jun. 10, 2013 (5 pages).

* cited by examiner

*Primary Examiner* — Tae H Yoon
(74) *Attorney, Agent, or Firm* — Kilyk & Bowersox, P.L.L.C.

(57) ABSTRACT

Silicone hydrogel contact lenses are formed from the reaction product of a polymerizable composition comprising at least one hydrophilic vinyl amide-containing monomer, at least one acrylate-containing siloxane monomer, and at least one hydrophilic vinyl ether-containing monomer. The contact lenses have ophthalmically-acceptable surface wettability and can be manufactured without the use of volatile organic solvents.

18 Claims, No Drawings

SILICONE HYDROGEL CONTACT LENSES

This application is a National Stage Application of PCT/US2012/026226, filed Feb. 23, 2012, and which claims the benefit under 35 U.S.C. §119(e) of prior U.S. Provisional Patent Application No. 61/447,216, filed Feb. 28, 2011, which is incorporated in its entirety by reference herein.

FIELD

The field of the invention relates to silicone hydrogel contact lenses.

BACKGROUND

Contact lenses made from silicone hydrogels are rapidly gaining popularity over contact lenses made from conventional hydrogel materials because, like conventional hydrogel lenses, they are comfortable to wear, but they have the added advantage of having higher oxygen permeability, which is believed to be healthier for the eye. However, contact lenses made from silicone hydrogels often have physical properties that make them more difficult to process during manufacturing, and typically the lenses need to be extracted in volatile organic solvents to achieve acceptable surface wettability and good dimensional stability. The use of volatile organic solvents in manufacturing presents safety and environmental concerns and adds costs to the manufacturing process.

New formulations of silicone hydrogel contact lenses that can be manufactured without the use of volatile organic solvents, and that result in dimensionally stable contact lenses having ophthalmically-acceptable surface wettabilities are desired.

Some patent documents describing silicone hydrogel contact lenses include U.S. Publ. No. 2007/0296914, U.S. Publ. No. 2007/0066706, U.S. Publ. No. 2007/0231292, U.S. Pat. No. 5,965,631, WO 2011/041523, U.S. Pat. No. 5,358,995, European Publ. No. 1870736A1, U.S. Publ. No. 2006/063852, U.S. Publ. No. 2011/0009587, and U.S. Publ. No. 2009/0234087.

SUMMARY

We have made improved silicone hydrogel contact lenses having ophthalmically acceptably wettable lens surfaces that can be manufactured without the use of volatile organic solvents. The present disclosure is directed to a silicone hydrogel contact lens comprising a polymeric lens body that is a reaction product of a polymerizable composition comprising at least one hydrophilic vinyl amide-containing monomer, at least one acrylate-containing siloxane monomer, and at least one vinyl ether-containing monomer.

In one example, the polymerizable composition has a total amount of hydrophilic vinyl amide-containing monomer of from about 50 mol. % to about 80 mol. %. In one example, the polymerizable composition has a total amount of acrylate-containing siloxane monomer of from about 2 mol. % to about 15 mol. %. In one example, the polymerizable composition has a total amount of vinyl ether-containing monomer of from about 2 mol. % to about 20 mol. %. In a further example, the polymerizable composition has a molar ratio of total amount of hydrophilic vinyl amide-containing monomer to total amount of vinyl ether-containing monomer of from 2:1 to 30:1, respectively.

In one example, the at least one hydrophilic vinyl amide-containing monomer is selected from N-vinyl-N-methyl acetamide (VMA), or N-vinyl pyrrolidone (NVP), or a combination thereof.

In one example, the at least one vinyl ether-containing monomer is selected from 1,4-butanediol vinyl ether (BVE), or ethylene glycol vinyl ether (EGVE), or diethylene glycol vinyl ether (DEGVE), or 1,4-cyclohexanedimethanol vinyl ether (CHDMVE), or a poly(ethylene glycol) vinyl ether having from 4 to 10 ethylene glycol units, or a poly(ethylene glycol) vinyl ether having more than 10 ethylene glycol units, or any combination thereof.

In any of the foregoing examples, the polymerizable composition may further comprise at least one vinyl-containing cross-linking agent. In one example the at least one vinyl-containing cross-linking agent is selected from divinyl ether, or divinyl sulfone, or triallyl phthalate, or triallyl isocyanurate, or diallyl phthalate, or diethyleneglycol divinyl ether, or triethyleneglycol divinyl ether, or any combination thereof.

Another aspect of the present disclosure is a method of manufacturing the silicone hydrogel contact lens of any one of the foregoing examples comprising: polymerizing the polymerizable composition to make the polymeric lens body, and washing the polymeric lens body with a washing liquid to remove unreacted or partially reacted components from the polymeric lens body.

DETAILED DESCRIPTION

Silicone hydrogel contact lenses are described herein that can be manufactured without the use of volatile organic solvents. The contact lenses have good manufacturing processability, are dimensionally stable, and have ophthalmically-acceptable surface wettability. The silicone hydrogel contact lens comprises a polymeric lens body that is the reaction product of a polymerizable composition comprising at least one hydrophilic vinyl amide-containing monomer, at least one acrylate-containing siloxane monomer, and at least one vinyl-ether containing monomer. In one example, the polymerizable composition has an amount of the at least one vinyl-ether containing monomer that increases wettability of the contact lens compared to a contact lens made from a formulation lacking the at least one vinyl-ether containing monomer, but that is otherwise identical.

The following definitions for the quoted terms provided below are applicable herein unless context indicates otherwise:

A "monomer" refers to any molecule capable of reacting with other molecules that are the same or different, to form a polymer or copolymer. Thus, the term encompasses polymerizable pre-polymers and macromers, there being no size-constraint of the monomer unless indicated otherwise.

A "vinyl amide-containing monomer" is any vinyl monomer that contains an N-vinyl polymerizable group, and no other polymerizable group, where N designates nitrogen.

A "vinyl ether-containing monomer is any vinyl monomer that contains an O-vinyl polymerizable group, and no other polymerizable group, where 0 designates oxygen.

A monomer is considered "hydrophilic" if at least 50 grams of the monomer are fully soluble in 1 liter of water at 20° C. (i.e., ≥5% soluble in water) as determined visibly using a standard shake flask method.

A "siloxane monomer" contains at least one Si—O group, and is typically either "mono-functional" or "multi-functional", meaning that it has either one polymerizable group or two or more polymerizable groups, respectively. A "non-siloxane monomer" is a monomer that does not contain any Si—O groups. An "acrylate-containing siloxane monomer" is a siloxane monomer that has at least one polymerizable acrylate group (e.g. methyl methacrylate, acrylamide, etc.).

A "polymerizable composition" is a composition comprising polymerizable ingredients, where the composition has not yet been subjected to conditions that result in polymerization of the polymerizable ingredients.

We have discovered that the inclusion of at least one vinyl-ether containing monomer in a polymerizable composition comprising at least one acrylate-containing siloxane monomer and at least one vinyl-amide monomer can be polymerized to provide a polymeric lens body that can be processed without volatile organic solvents and result in contact lenses that have ophthalmically-acceptable surface wettability. References herein to 'at least one' of a type of ingredient refer to both a) a single ingredient, and b) a combination of two or more ingredients of the same type.

In one example, the polymerizable composition has a total amount of hydrophilic vinyl amide-containing monomer of from about 50, 55, or 60 molar percent (mol. %) up to about 70, 75, 80, or 85 mol. %; a total amount of vinyl ether-containing monomer of from about 2, 4, or 6 mol. % up to about 10, 15, 20, or 25 mol. %; and a total amount of acrylate-containing siloxane monomer of from about 2, 3, 4, 5, or 6 mol. % up to about 8, 10, 12, 15, 18, or 20 mol. %, where molar percent values are based upon total moles of reactive ingredients in the polymerizable composition, with non-reactive ingredients, such as diluents and other non-reactive components, being excluded from the calculation. References herein to 'a total amount' of a particular component (i.e. a combination of two or more ingredients of the same type) in a polymerizable composition refer to the sum of the amounts of all ingredients of the same type. Further, throughout this disclosure, when a series of values is presented with a qualifier preceding the first value, the qualifier is intended to implicitly precede each value in the series unless context indicates otherwise. For example, in the above listing of molar percent ranges for the total amount of hydrophilic vinyl amide-containing monomer, it is intended that the qualifier "from about" implicitly precedes the values of 50, 55, and 60; and the qualifier "up to about" implicitly precedes the values of 70, 75, 80, and 85. Also, throughout this disclosure, when a series of values is presented with a unit of measurement following the last value of the series, the unit of measurement is intended to implicitly follow each preceding value in the series unless context indicates otherwise. For example, in the above listing of molar percent ranges for the total amount of hydrophilic vinyl amide-containing monomer, it is intended that the unit of measurement "mol. %" implicitly follows the values of 50, 55, 70, 75, and 80. Also, when a series of lower limit ranges and a series of upper limit ranges are provided, all combinations of the provided ranges are contemplated as if each combination were specifically listed. For example, in the above listing of molar percent ranges for the total amount of hydrophilic vinyl amide-containing monomer, all 12 possible molar percent ranges are contemplated (i.e. from 50 to 70 mol. %, from 50 to 75 mol. % . . . from 60 to 80 mol. %, and from 60 to 85 mol. %). Also, throughout this disclosure a reference to "an example" or "a specific example" or similar phrase, is intended to introduce a feature or features of the contact lens, polymerizable composition, or method of manufacture (depending on context) that can be combined with any combination of previously-described or subsequently-described examples (i.e. features), unless a particular combination of features is mutually exclusive, or if context indicates otherwise.

In some examples, the hydrophilic vinyl amide-containing monomer can be selected from N-vinyl-N-methyl acetamide (VMA), or N-vinyl pyrrolidone (NVP), or N-vinyl formamide, or N-vinyl acetamide, or N-vinyl-N-ethyl acetamide, or N-vinyl isopropylamide, or N-vinyl caprolactam, or N-vinyl-N-ethyl formamide, or any combination thereof. In some examples, the at least one hydrophilic vinyl amide-containing monomer consists of VMA or NVP, or a combination of VMA and NVP.

The vinyl ether-containing monomer can be selected from 1,4-butanediol vinyl ether (BVE), or ethylene glycol vinyl ether (EGVE), or diethylene glycol vinyl ether (DEGVE), or 1,4-cyclohexanedimethanol vinyl ether (CHDMVE), or a poly(ethylene glycol) vinyl ether having from 4 to 10 ethylene glycol units, or a poly(ethylene glycol) vinyl ether having more than 10 ethylene glycol units, or any combination thereof. In some examples, the vinyl ether-containing monomer can be a poly(ethylene glycol) vinyl ether having at least 1, 2, or 3 ethylene glycol units and up to 4, 6, 8, or 10 ethylene glycol units. The polymerizable composition can have a molar ratio of the total amount of vinyl amide-containing monomer to the total amount of vinyl ether-containing monomer of from about 2:1, 3:1, 4:1, or 5:1 up to about 15:1, 20:1, 25:1, or 30:1 respectively.

One or more vinyl-containing monomers, in addition to the hydrophilic vinyl amide-containing monomers and vinyl ether-containing monomers, may be included in the polymerizable compositions described herein. As used herein, a "vinyl-containing monomer" is any non-siloxane monomer that has a single polymerizable carbon-carbon double bond (i.e., a vinyl group) present in its molecular structure, where the carbon-carbon double bond of the vinyl group is less reactive than the carbon-carbon double bond present in an acrylate or a methacrylate polymerizable group under free radical polymerization. Thus, while a carbon-carbon double bond is present in acrylate groups and methacrylate groups, as used herein, monomers comprising a single acrylate or methacrylate polymerizable group are not considered to be vinyl-containing monomers. Thus, for example, vinyl monomers having a single vinyl ester or allyl ester polymerizable group may be included in the polymerizable composition in addition to the vinyl amide-containing monomers and vinyl ether-containing monomers.

In various examples where more than one hydrophilic vinyl-containing monomer is included in the polymerizable composition, at least 50%, 60%, 70% or 80% by weight of the hydrophilic vinyl-containing monomer has a solubility in water of ≥10%, 15% or 20%. In a specific example, 100% of the hydrophilic vinyl-containing monomer in the polymerizable composition has a solubility in water of ≥10%, 15%, or 20%. The hydrophilic vinyl-containing monomer typically has a molecular weight of about 75 to about 500, and more typically about 75 to 250.

Acrylate-containing siloxane monomers that can be used in the polymerizable compositions described herein are well-known in the field, such as those referenced in the patent publications cited in the Background section above. The acrylate-containing siloxane monomer may be mono-functional, bi-functional, or comprise a combination of mono- and bi-functional acrylate-containing siloxane monomers. In examples where the acrylate-containing siloxane monomer consists of one or more mono-functional acrylate-containing siloxane monomers (i.e. it does not contain any multi-functional acrylate-containing siloxane monomers), the polymerizable composition will typically further comprise an acrylate-containing cross-linking agent, described further below. In a specific example, the acrylate-containing siloxane monomer has one or more polymerizable methacrylate groups. Various non-limiting examples of suitable acrylate-containing siloxane monomers include 3-[tris(trimethylsiloxy)silyl] propyl methacrylate ("TRIS"), 3-methacryloxy-2-hydroxypropyloxy)propylbis(trimethylsiloxy)methylsilane ("SiGMA"), methyldi(trimethylsiloxy)sylylpropylglycerolethyl methacrylate ("SiGEMA"), and monomethacryloxypropyl functional polydimethylsiloxanes such as MCR-M07 and MCS-M 11, all available from Gelest (Morrisville, Pa., USA).

In one example, the acrylate-containing siloxane monomer may comprise a monomer represented by formula (I),

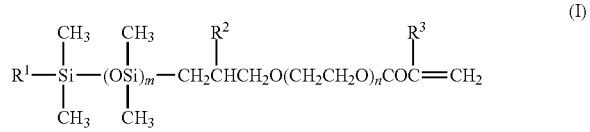

(I)

where m is an integer from 3 to 10, n is an integer from 0 to 10, $R^1$ is an alkyl group having 1 to 4 carbon atoms, $R^2$ is hydrogen or a methyl group, and $R^3$ is hydrogen or a methyl group. In a further specific example, the acrylate-containing siloxane monomer is represented by formula I wherein $R^1$ is a butyl group, $R^2$ is hydrogen, $R^3$ is a methyl group, m is 4, and n is 1. This particular siloxane monomer is designated "Si-1" in the Examples section below. Methods of making siloxane monomers represented by formula (I) are described in U.S. Publ. no. 20090299022, incorporated herein by reference.

Yet another exemplary acrylate-containing siloxane monomer is represented by formula (II),

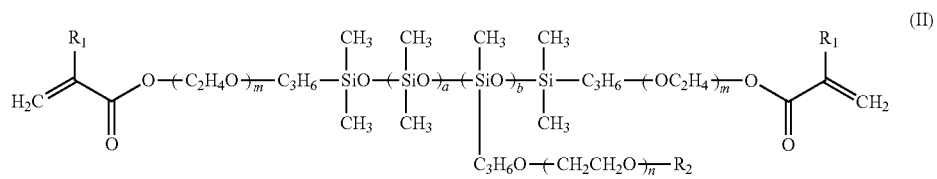

(II)

wherein $R_1$ is selected from either hydrogen or a methyl group; $R_2$ is selected from either hydrogen or a $C_{1-4}$ hydrocarbon group; m represents an integer of from 0 to 10; n represents an integer of from 4 up to about 15, 25, or 100; a and b represent integers of 1 or more; a+b is equal to 20-500; b/(a+) is equal to 0.01-0.22; and the configuration of siloxane units includes a random configuration. In a more specific example, the acrylate-containing siloxane monomer is represented by formula II wherein $R_1$ and $R_2$ are methyl groups, m is 0, n represents an integer from about 5 to about 10, a represents an integer of from about 70 to about 90, and b represent an integer of from 1 to about 10; this siloxane monomer is designated "Si-2" in the Examples section below and has a molecular weight of about 8,000 to about 10,000. Methods of making compounds of formula II are described in U.S. Publication no. 2009/0234089, incorporated herein by reference.

Another exemplary acrylate-containing siloxane monomer is represented by formula (III),

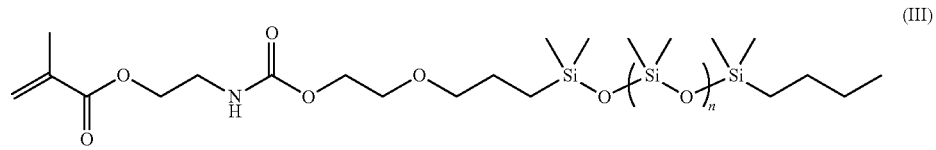

(III)

where n is an integer from about 10 to 15. Siloxane monomers of formula III and other suitable monomers are described in U.S. Pat. No. 6,867,245 and U.S. Pat. No. 6,310,169, both incorporated herein by reference.

Other suitable acrylate-containing siloxane monomers are represented by formula (IV):

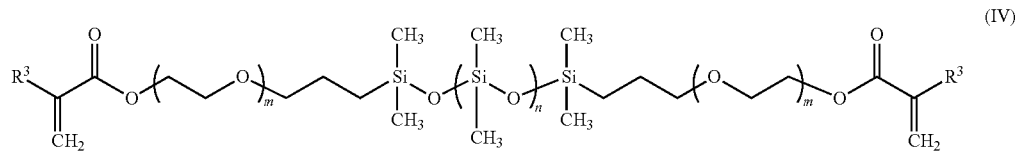

wherein $R^3$ is selected from either hydrogen or a methyl group, m represents an integer from 0 to 10, and n represents an integer from 1 to 500. In a specific example, the acrylate-containing siloxane monomer is a methacryloxypropyl-terminated polydimethylsiloxane represented by formula III where $R^3$ is a methyl group, m is 0, and n is an integer from 40 to 60. This monomer is available from Gelest (Morrisville, Pa., USA) and is referred to as "DMS-R18" from the manufacturer and as "Si-3" in the Examples below. Additional suitable methacryloxypropyl-terminated polydimethylsiloxanes include DMS-R22 and DMS-R31, also available from Gelest.

Yet another suitable acrylate-containing siloxane monomer is represented by formula (V),

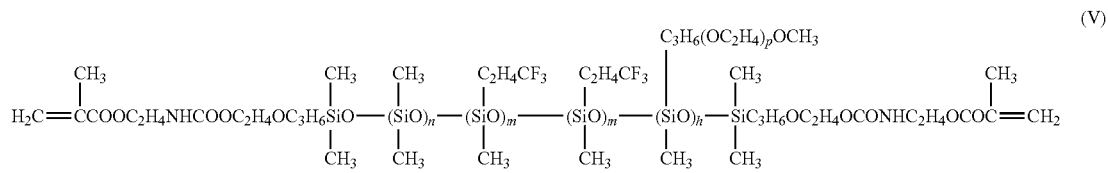

wherein n is an integer of about 100 to 150, m and p are both integers of about 5 to 10, and h is an integer of about 2 to 8. Methods of making compounds of formula V are described in U.S. Pat. No. 6,867,245, incorporated herein by reference. Additional acrylate-containing siloxane monomers that can be used in the polymerizable composition described herein are known in the field (see e.g. U.S. Pat. No. 7,572,841, U.S. Publ. no. 2006/0063852, and U.S. Pat. No. 5,998,498, each incorporated herein by reference).

In one example, the acrylate-containing siloxane monomer may comprise a combination of a mono-functional acrylate-containing siloxane monomer and a bi-functional acrylate-containing siloxane monomer. In this example, the bi-functional acrylate-containing siloxane monomer may be present in the polymerizable composition in amounts of from about 0.04, 0.06, 0.08, or 0.10 mol. % and up to about 0.20, 0.25, 0.30, or 0.35 mol. %; and the mono-functional acrylate-containing siloxane monomer may be present in amounts of from about 2, 3, 4 or 5 mol. % up to about 8, 10, 12, 15, or 18 mol. %. In one such example, the mono-functional acrylate-containing siloxane monomer has a molecular weight of less than 2,000, 1,500, 1,000, or 750, and the bi-functional acrylate-containing siloxane monomer has a molecular weight of at least 3,000, 3,500, 4,000, 4,500, 5,000, 6,000, 7,000, or 8,000. In the case of polyorganosiloxane prepolymers, such as those represented by formulas III, IV, and V above, and other polydisperse monomers, the term "molecular weight" as used herein, refers to the absolute number average molecular weight (in units of Daltons) of the monomer as determined by $^1$H NMR end-group analysis. In a specific example, the mono-functional acrylate-containing siloxane monomer has a molecular weight of from about 250 to about 1000, and the bi-functional acrylate-containing siloxane monomer has a molecular weight of from about 5,000 to about 16,000. In a further specific example, the mono-functional acrylate-containing siloxane monomer has a molecular weight of from about 500 to about 1000, and the bi-functional acrylate-containing siloxane monomer has a molecular weight of from about 5,000 to about 12,000.

In the above-described example wherein the acrylate-containing siloxane monomer comprises a combination of a mono-functional acrylate-containing siloxane monomer and a bi-functional acrylate-containing siloxane monomer, the mono-functional acrylate-containing siloxane monomer and bi-functional acrylate-containing siloxane monomer may be present in the polymerizable composition at a molar ratio of at least 20:1, 30:1, 40:1, 50:1, 75:1 or 100:1, and optionally up to about 150:1, 175:1, 200:1, 225:1 or 250:1, respectively.

In one example, the polymerizable composition may further comprise an acrylate-containing monomer to further enhance mechanical strength and/or stiffness of the lens, or confer other desired properties. As used herein, an "acrylate-containing monomer" is any non-siloxane monomer that has a single polymerizable acrylate group (e.g. methyl methacrylate, acrylamide, etc.). When present, the total amount of acrylate-containing monomer in the polymerizable composition typically comprises from about 12, 14, 16, or 18 mol. % and up to about 20, 25, or 30 mol. %. In a specific example, the acrylate-containing monomer has a polymerizable methacrylate group. Numerous suitable acrylate-containing monomers are known in the field. Exemplary acrylate-containing monomers include methyl methacrylate (MMA), 2-hydroxybutyl methacrylate (HOB), tert butyl methacrylate (tBMA), N,N-dimethylacrylamide (DMA), 2-hydroxyethyl methacrylate (HEMA), ethoxyethyl methacrylamide (EOEMA), ethylene glycol methyl ether methacrylate (EGMA), isobornyl methacrylate (IBM), and combinations thereof.

In one example, the polymerizable composition may further comprise a cross-linking agent. As used herein, a "cross-linking agent" is any compound having a molecular weight of less than about 2,000 with two or more polymerizable ethylenically unsaturated groups. Thus, a cross-linking agent can react with functional groups on two or more polymer chains so as to bridge one polymer to another. As used herein, "acrylate-containing cross-linking agent" has at least two polymerizable acrylate groups, and no other type of polymerizable group. A "vinyl-containing cross-linking agent" has at least two polymerizable vinyl groups, and no other type of polymerizable group, where the carbon-carbon double bond of the vinyl groups are less reactive than the carbon-carbon double bond present in an acrylate or a methacrylate polymerizable group under free radical polymerization.

Examples of vinyl-containing cross-linking agents that can be used in the polymerizable compositions disclosed herein include, without limitation, divinyl ethers, or divinyl sulfones, or triallyl isocyanurates, and any combination thereof. Exemplary divinyl ethers include diethyleneglycol divinyl ether, or triethyleneglycol divinyl, or 1,4-butanediol divinyl ether, or 1,4-cyclohexanedimethanol divinyl ether, or any combination thereof. Other cross-linking agents suitable for use in silicone hydrogel polymerizable compositions are known in the field (see e.g. the patent publications listed in the Background section). Typically, the vinyl-containing cross-linking agent can have two or three polymerizable vinyl groups. The vinyl-containing cross-linking agents, as well as the acrylate-containing cross-linking agents described further below, typically can have a molecular weight of less than 1500, 1000, 500, or 250. When present, the total amount of vinyl-containing cross-linking agent in the polymerizable composition is typically from about 0.02, 0.04, or 0.06 mol. % up to about 0.10, 0.15, or 0.20 mol. %.

Examples of acrylate-containing cross-linking agents that can be used in the polymerizable compositions disclosed herein, include, without limitation, lower alkylene glycol di(meth)acrylate, poly(lower alkylene)glycol di(meth)acrylate, lower alkylene di(meth)acrylate, trimethylolpropane tri(meth)acrylate, pentaerythritol tetra(meth)acrylate, bisphenol A di(meth)acrylate, methylenebis(meth)acrylamide, and 1,3-Bis(3-methacryloxypropyl)tetramethyldisiloxane. In certain examples the acrylate-containing cross-linking agent is free of siloxane moieties, i.e. it is a non-siloxane cross-linking agent. When present, the total amount of acrylate-containing cross-linking agent in the polymerizable composition is typically from about 0.20, 0.25, 0.30, or 0.35 mol. % up to about 0.50, 0.60, 0.70, 0.80, or 1.0 mol. %.

The polymerizable compositions can also be described in terms of the percentage by weight (wt. %) of each reactive component in the polymerizable composition, and wt. % ratios of various reactive components, wherein the weight percentages are based on total weight of reactive components of the composition relative to the total weight of all reactive components. For example, the polymerizable composition may have a total amount of hydrophilic vinyl amide-containing monomer of from about 20, 25, or 30 wt. % up to about 50, 55, or 60 wt. %; a total amount of vinyl ether-containing monomer of from about 1, 2, or 4 wt. % up to about 10, 15, or 20 wt. %; and a total amount of acrylate-containing siloxane monomer of from about 20, 25, or 30 wt. % up to about 50, 55 or 60 wt. %. In one example, the polymerizable composition may have a total amount of vinyl-containing cross-linking agent of from about 0.02, or 0.05 wt. % up to about 0.5, or 1.0 wt. %. In another example, the polymerizable composition has a total amount of an acrylate-containing cross-linking agent of from about 0.05 wt. % to about 4 wt. %. In one example, the polymerizable composition may further comprise from about 5, or 10 wt. % up to about 20, or 25 wt. % of an acrylate-containing monomer. These wt. % examples of the polymerizable composition may be combined with any of the above-described molar ratio and/or molar percentage examples.

Polymerizable compositions described herein result in contact lenses that have ophthalmically acceptably wettable lens surfaces without the inclusion of a high molecular weight hydrophilic polymer (i.e. a preformed polymer) in the polymerizable composition. In a particular example, the polymerizable composition is substantially free of a hydrophilic polymer. As used herein, "substantially free" means none or an inconsequential amount, i.e. an amount that has no measurable affect on the physical properties of the lens. However, such hydrophilic polymers may be included in the polymerizable composition, if desired. Examples of such hydrophilic polymers include polyamides, polylactams (especially polyvinylpyrrolidone), polyimides, polylactones, and polydextrans, having molecular weights of at least 50,000, and are described in U.S. Pat. No. 6,367,929, incorporated herein by reference. Accordingly, in another example the polymerizable composition additionally comprises a hydrophilic polymer in an amount that increases the wettability of the contact lens relative to a contact lens that lacks the hydrophilic polymer but is otherwise identical.

As will be appreciated by those skilled in the art, the polymerizable composition will typically comprise non-polymerizable ingredients, in addition to the polymerizable ingredients, that are conventionally used in contact lens formulations. For example, the polymerizable composition will typically include a polymerization initiator, a UV absorbing agent, and a tinting agent. Additional ingredients may also be included such as an organic diluent, an oxygen scavenger, or a chain transfer agent. Non-limiting examples of these and additional ingredients that may be included in the polymerizable composition are provided in U.S. Publication no. 2007/0296914, and below.

Contact lenses can be made from the polymerizable compositions described herein using curing and other processing methods known in the field, such as cast molding, spin casting, injection molding, forming a polymerized rod that is subsequently lathed, etc. In a specific example, the polymerizable composition is cast molded between molds formed of a thermoplastic polymer. The thermoplastic polymer is typically a non-polar material, such as polypropylene, but polar mold materials are also used in the field. Briefly, a first mold member defining the front surface of the contact lens, referred to as a "female mold member", is filled with an amount of the polymerizable composition sufficient to form a single polymeric lens body. A second mold member defining the back (i.e. eye-contacting) surface of the contact lens, referred to as the "male mold member", is coupled to the female mold member to form a mold assembly having a lens-shaped cavity with the amount of polymerizable composition therebetween.

The polymerizable composition within the contact lens mold assembly is polymerized using any suitable curing method. Typically, the polymerizable composition is exposed to polymerizing amounts of heat or ultraviolet light (UV). In the case of UV-curing, also referred to as photopolymerization, the polymerizable composition typically comprises a photoinitiator such as benzoin methyl ether, 1-hydroxycyclohexylphenyl ketone, Darocur or Irgacur (available from Ciba Specialty Chemicals). Photopolymerization methods for contact lenses are described in U.S. Pat. No. 5,760,100. In the case of heat-curing, also referred to as thermal curing, the polymerizable composition typically comprises a thermal initiator. Exemplary thermal initiators include 2,2'-azobis(2, 4-dimethylpentanenitrile) (VAZO-52), 2,2'-Azobis(2-methylpropanenitrile) (VAZO-64), and 1,1'-azo bis(cyanocyclohexane) (VAZO-88). In an exemplary thermal curing method that can be used to polymerize polymerizable compositions described herein, the mold assemblies are subjected to a first curing temperature of from about 50 to 65° C., which is maintained for about 15 to 45 minutes, and then the temperature is increased to a second temperature of at least about 70° C. In one such example, the second curing temperature can be from about 70 to 85° C. and can be maintained for about 15 to 45 minutes, then the temperature can be increased again to at least about 90° C., and can be maintained until polymerization is substantially complete, typically at least about 15 minutes. Additional thermal polymerization methods for contact lenses are described in US Publ. no. 2007/0296914 and U.S. Pat. No. 7,854,866, incorporated herein by reference.

At the completion of curing, the polymerized material between the mold members of the mold assembly has the shape of a contact lens, and is referred to herein as a "polymeric lens body". The male and female mold members are demolded, i.e. separated, and the polymeric lens body is removed, i.e. delensed, from the mold member to which it is adhered. These processes are referred to as demolding and delensing, respectively, and a variety of such methods are known to those of ordinary skill in the field. In some methods, the demolding and delensing processes can comprise a single process step, such as when the molds are separated using a liquid which also removes the polymeric lens body from the mold. In other methods, such as when a dry-demolding process is used, the polymeric lens body typically remains on one of the mold members and is delensed in a subsequent process step. Delensing can also be a wet or dry process. In one example, delensing is carried out by a "float off" method in which the mold member to which a polymeric lens body is adhered is immersed in water. The water may optionally be heated (e.g. up to about 100° C.). Typically, the polymeric lens bodies float off of the mold members in about ten minutes. Dry delensing can be carried out manually, for example using tweezers to remove the polymeric lens bodies from the mold member, or they can be removed using an automated mechanical process, such as described in U.S. Pat. No. 7,811,483. Additional demolding and delensing methods for silicone hydrogel contact lenses are described in US Publ No. 2007/0035049.

After delensing, the polymeric lens body is washed to remove unreacted or partially reacted ingredients from the polymeric lens body and to hydrate the polymeric lens body. In a specific example, the polymeric lens body is washed in a washing liquid free of volatile organic solvents (e.g. methanol, ethanol, chloroform, etc.), and all liquids used to wash the polymeric lens body are free of volatile organic solvents. This type of washing may also be referred to herein as "organic solvent-free extraction" where "organic solvent" refers to volatile organic solvents. For example, a washing step that uses aqueous solutions of surfactants such as Tween 80, without any volatile organic solvents, is considered to be a volatile organic solvent-free extraction. In a further example, the polymeric lens body is not contacted by any volatile organic solvents during the manufacturing process (i.e. from the time curing of the polymeric lens body is complete until the time it is sealed in its final packaging). While the polymerizable compositions described herein can be used to make polymeric lenses bodies that can be washed without the use of volatile organic solvents, if desired, they can also be washed with organic solvents. Thus, washing steps can include contacting the polymeric lens body with a volatile organic solvent, such as a lower alcohol (e.g. methanol, ethanol, etc.), contacting the polymeric lens body with aqueous liquids that may or may not contain a volatile organic solvents, solutes, or combinations thereof. Exemplary washing methods are described in US Pat Publ no. 2007/0296914 and in Example 1 below.

The good wettability of the contact lenses achieved from the polymerizable compositions described herein avoids the need for post-polymerization surface modification of the polymeric lens body to impart wettability. One example of a post-polymerization surface modification used to impart wettability is surface plasma treatment (see e.g.U.S. Pat. No. 4,143,949). Another example of a post-polymerization modification to impart wettability is the coating of hydrophilic polymers onto the surface of the polymeric lens body such as by a layer-by-layer technique (see e.g. U.S. Pat. No. 7,582,327), or by the addition of a hydrophilic polymer into the packaging solution (see e.g. U.S. Pat. No. 7,841,716). Accordingly, in a specific example, the method of making the contact lens is free of a post-polymerization surface modification. For example, the method may not include a plasma surface modification of the polymeric lens body and/or a hydrophilic polymer may not be coated onto the polymeric lens body and/or a hydrophilic polymer may not be added to the packaging solution that is placed into the contact lens package.

After washing, and any optional surface modifications, the hydrated polymeric lens body is typically placed into a blister package, glass vial, or other appropriate container, all referred to herein as "packages." A packaging solution is also added to the container, which is typically a buffered saline solution such as phosphate- or borate-buffered saline. The packaging solution may optionally contain additional ingredients such as a comfort agent, a hydrophilic polymer, a surfactant or other additive that prevents the polymeric lens body from sticking to the container, etc. The package is sealed, and the sealed polymeric lens body is sterilized by sterilizing amounts of radiation, including heat or steam, such as by autoclaving, gamma radiation, e-beam radiation, ultraviolet radiation, etc. The final product is a sterile, packaged ophthalmically-acceptable contact lens.

Typically, lenses that have been processed using organic solvent-free extraction will have a "wet extractable component". In specific examples, the wet extractable component of the final contact lens product constitutes about 2 to about 8% of the dry weight of the contact lens, and usually about 3 to about 6% of the dry weight of the contact lens. The percentage of the wet extractable component in a contact lens is determined using a Sohxlet extraction process as follows: Five fully-hydrated, sterilized contact lenses from a single lot are removed from their packages and excess packaging solution is removed from the lenses with a paper towel. The lenses are dried overnight in an 80° C. vacuum oven, then each dried lens is weighed to get the dry weight of the lens (W1). Each lens is then placed in a perforated, stackable Teflon thimble, and the thimbles are stacked to form an extraction column with an empty thimble placed at the top of the column. The extraction column is placed into a small Sohxlet extractor (VWR 80068-164) and the extractor is attached to a condenser (VWR 80068-1580) and a 125 ml round bottom flask (VWR-80068-704) containing about 70-80 ml methanol. Water is circulated around the condenser and the methanol is heated until it gently bubbles. The lenses are extracted for 4 hours from the time condensed methanol first begins to drop. The methanol-extracted lenses are removed from the thimbles and dried overnight at 80° C. in a vacuum oven. Each lens is weighed to obtain the dry weight of the extracted lens (W2), and the following calculation is made for each lens: $[(W1-W2)/W1]*100$. The average of the five values is taken to be the percentage of wet extractable for each lens of the lot of lenses tested.

The contact lenses described herein are "ophthalmically-acceptable" meaning that the lenses have ophthalmically acceptably wettable lens surfaces and ionoflux values such that the lenses typically do not cause or are not associated with significant corneal swelling, corneal dehydration ("dry eye"), superior epithelial arcuate lesions ("SEALs"), or other significant discomfort. Determining whether a contact lens is ophthalmically acceptable can be achieved using conventional clinical methods, such as those performed by an eye care practitioner, and as understood by persons of ordinary skill in the art.

In any of the above-described examples, the contact lens may be characterized by one or more of the following properties: ionoflux, contact angle, oxygen permeability, tensile modulus, equilibrium water content, and % energy loss, as detailed in the following seven paragraphs.

In any of the above-described examples, the contact lens may have an ionoflux of less than about $10 \times 10^{-3}$ mm$^2$/min, $9 \times 10^{-3}$ mm$^2$/min, $8 \times 10^{-3}$ mm$^2$/min, $7 \times 10^{-3}$ mm$^2$/min, $6 \times 10^{-3}$ mm$^2$/min, $5 \times 10^{-3}$ mm$^2$/min, or $4 \times 10^{-3}$ mm$^2$/min as measured using the "Ionoflux Technique" described in U.S. Pat. No. 5,849,811, incorporated by reference herein, or an equivalent method such as the following method that was used to determine the ionoflux values provided in the Examples below. A hydrated lens is placed in 40 ml deionized water for 10 minutes. The lens is then placed in a lens-retaining device, between male and female portions. The male and female portions include flexible sealing rings which are positioned between the lens and the respective male or female portion. The lens-retaining device is then placed in a threaded lid. The lid is screwed onto a glass tube to define a donor chamber. The donor chamber is filled with 16 ml of 0.1 molar NaCl solution. A 100 ml beaker, used as a receiving chamber, is filled with 80 ml of deionized water. Leads of a conductivity meter and a stir bar are immersed in the deionized water of the receiving chamber. The receiving chamber is placed in a 250 ml beaker jacket that was filled with about 50 ml deionized water and connected to a water bath with temperature control set to achieve a temperature of about 35° C. in the receiving chamber. Finally, the donor chamber is immersed in the receiving chamber so that the NaCl solution inside the donor chamber is level with the water inside the receiving chamber. Once the temperature inside the receiving chamber reaches 35° C., conductivity is recorded for 10 minutes. The conductivity versus time data in each of the examples below was substantially linear.

In any of the above-described examples, the contact lens may have a contact angle of less than about 80°, 70°, or 60°, where the contact angle is the dynamic advancing contact angle as determined using a captive bubble method using a DSA 100 Drop Shape Analysis System from Krüss as described in Maldonado-Codina, C. and Morgan, P. B. (2007), *In vitro water wettability of silicone hydrogel contact lenses determined using the sessile drop and captive bubble techniques*. Journal of Biomedical Materials Research Part A, 83A: 496-502.

In any of the above-described examples, the oxygen permeability of the contact lens (Dk) may be at least 55 barrers, or at least 60 barrers. Dk values can be determined using standard methods in the industry, such as by using an Ox-Tran model oxygen transmission rate test system available from Mocon, Inc (Minneapolis, Minn.). The Dk values provided in the Examples below were determined using the method described by Chhabra et al. (2007), *A single-lens polarographic measurement of oxygen permeability (Dk) for hyper-transmissible soft contact lenses*. Biomaterials 28: 4331-4342.

In any of the above described examples, the contact lens may have a tensile modulus (i.e. Young's modulus) of about 0.2 MPa, 0.3 MPa, or 0.4 MPa, up to about 0.7 MPa, 0.8 MPa, or 0.9 MPa as measured by an ANSI Z80.20 standard using an Instron Model 3342 or Model 3343 mechanical testing system, or equivalent method. The modulus, elongation, and tensile strength values reported herein were determined using an Instron Model 3342 or 3343 mechanical testing system (Instron Corporation, Norwood, Mass., USA) and Bluehill Materials Testing Software, using a custom built rectangular contact lens cutting die with 4 mm spacing to prepare the rectangular sample strip. The modulus was determined inside a chamber having a relative humidity of least 70%. A lens was soaked in phosphate buffered solution (PBS) for at least 10 minutes prior to testing. While holding the lens concave side up, a central strip of the lens was cut using the cutting die. The thickness of the strip was determined using a calibrated gauge (Rehder electronic thickness gauge, Rehder Development Company, Castro Valley, Calif., USA). Using tweezers, the strip was loaded into the grips of the calibrated Instron apparatus, with the strip fitting over at least 75% of the grip surface of each grip. A test method designed to determine the maximum load (N), the tensile strength (MPa), the strain at maximum load (% elongation) and the mean and standard deviation of the tensile modulus (MPa) was run, and the results were recorded.

In any of the above-described examples, the contact lens may have an equilibrium water content (EWC) of greater than about 30 wt. %, 40 wt. % or 50 wt. % and up to about 60 wt. % or 70 wt. %. To measure EWC, excess surface water is wiped off of the lens and the lens is weighed to obtain the hydrated weight. The lens is dried in an oven at 80° C. under a vacuum, and weighed. The weight difference is determined by subtracting the weight of the dry lens from the weight of the hydrated lens. The wt. % EWC of the lens is =(weight difference/hydrated weight)×100. In a specific example, the contact angle is ≤70° and the equilibrium water content is at least about 40 wt. %.

The contact lenses described herein are considered "dimensionally stable" if they are from a batch (i.e. lot) of contact lenses that exhibit an average dimensional stability variance of ≤±3.0% (i.e. less than or equal to plus or minus three percent) as determined by the following method. The chord diameters of twenty lenses from a single lot are measured, and the average "original" diameter is obtained. Concurrently, twenty unopened packages of lenses from the same lot are placed in an incubator set at 55° C. The lenses are kept at this elevated temperature storage condition for three months to approximate a two-year shelf life at 25° C. At the end of three months the packaged lenses are brought to room temperature, removed from their packaging, and measured to obtain the average "final" diameter. The dimensional stability variance is calculated by the equation: (Diameter$_{Final}$–Diameter$_{Original}$/Diameter$_{Original}$)×100. In some examples, the dimensional stability variance is ≤±2.5% or ≤±2.0%. In other examples, the lenses have a dimensional stability variance of ≤±3.0% as determined using the above-described method except that the incubator is set at 65° C. This elevated temperature storage condition is considered to approximate a four-year shelf life at 25° C.

In any of the above described examples, the contact lens may have a percent energy loss of at least about 25, 27, or 30 up to about 37, 40, or 45 as determined using a test method in accordance with ANSI Z80.20. The energy loss values reported herein were determined using an Instron Model 3343 (Instron Corporation, Norwood, Mass., USA) mechanical testing system, with a 10N force transducer (Instron model no. 2519-101) and Bluehill Materials Testing Software including a TestProfiler module. Briefly, the energy loss was determined inside a chamber having a relative humidity of least 70%. A lens was soaked in phosphate buffered solution (PBS) for at least 10 minutes prior to testing. Using tweezers, the lens was loaded into the grips of the calibrated Instron apparatus, with the lens loaded vertically between the grips as symmetrically as possible and fitting over at least 75% of the grip surface of each grip. A test designed to determine the energy required to stretch the lens to 100% strain and then return it to 0% strain at a rate of 50 mm/minute was then run on the lens. The test was conducted only once on a single lens. Once the test was finished energy loss was calculated: Lost Energy (%)=(Energy to 100% strain–Energy to return to 0% strain)/Energy to 100% strain×100%.

As is evident from the disclosure of the application as a whole, including the claim structure and the specific examples, the exemplary components of the polymerizable composition disclosed herein are typically combined in embodiments of the invention. For example, the person skilled in the art would recognise that the polymerizable composition of the invention advantageously includes the exemplary acrylate-containing siloxane monomers disclosed herein in combination with the exemplary vinyl ether-containing monomers disclosed herein and/or in combination with the exemplary hydrophilic vinyl-amide containing monomers disclosed herein.

Thus, the acrylate-containing siloxane monomers disclosed in paragraphs [026]-[031] above are, advantageously, present in the polymerizable compositions of the invention in combination with any of the vinyl ether-containing monomers disclosed in paragraph [023]. For example, TRIS, SiGMA, SiGEMA, or the acrylate-containing siloxane monomers of formula (I) may optionally be used in combination with any one of the vinyl ether-containing monomers disclosed in paragraph [023], especially in combination with BVE, DEGVE and/or EGVE.

Advantageously, the acrylate-containing siloxane monomers disclosed in paragraphs [026]-[031] above are present in the polymerizable compositions of the invention in combination with any of the hydrophilic vinyl amide-containing monomers disclosed in paragraph [022]. For example, TRIS, SiGMA, SiGEMA, or the mono-functional acrylate-containing siloxane monomers of formula (I) may optionally be used in combination with any one of the hydrophilic vinyl-amide containing monomers disclosed in paragraph [022], especially in combination with VMA and/or NVP.

Similarly, the vinyl ether-containing monomers disclosed in paragraph [023], are, advantageously, present in the polymerizable compositions of the invention in combination with any of the hydrophilic vinyl amide-containing monomers disclosed in paragraph [022]. For example, BVE, DEGVE and/or EGVE may optionally be used in combination with any of the hydrophilic vinyl amide-containing monomers disclosed in paragraph [022], especially in combination with VMA and/or NVP.

Furthermore, the acrylate-containing siloxane monomers disclosed in paragraphs [028] and [029] above are, advantageously, present in the polymerizable compositions of the invention in combination with any of the vinyl ether-containing monomers disclosed in paragraph [023], and any of the hydrophilic vinyl amide-containing monomers disclosed in paragraph [022]. Thus, the polymerizable compositions of the invention may optionally include a combination of one or more of TRIS, SiGMA, SiGEMA, or the mono-functional acrylate-containing siloxane monomers of formula (I), together with both (i) a vinyl ether-containing monomer (such as BVE, DEGVE or EGVE) and (ii) a hydrophilic vinyl amide-containing monomer (such as VMA or NVP).

As demonstrated by the specific examples, it has been found that combinations of the preferred acrylate-containing siloxane monomers, vinyl ether-containing monomers, and/or hydrophilic vinyl amide-containing monomers of the invention provide contact lenses of the invention with advantageous properties.

EXAMPLES

The following Examples illustrate certain aspects and advantages of the present invention, which should be understood not to be limited thereby. Example 1 describes contact lens processing methods, and Examples 2-9 show exemplary polymerizable compositions that were used to make contact lenses using the methods described in Example 1. The resulting lenses were optically clear, meaning that light transmittance between 381 nm to 780 nm was at least 97% (measured in accordance with ISO 18369) and had ophthalmically-acceptable surface wettability. Additional physical properties of the lenses are provided in the examples below. Table 1 shows the abbreviation used for each ingredient as well as its molecular weight, which was used to calculate the molar ratios shown in each example. The molar ratios provided for each formulation were determined by dividing the unit amount of an ingredient by its molecular weight to obtain the relative molar amount of the ingredient in the polymerizable composition, and comparing that value to the molar amount of another ingredient in the composition. For each polymerizable composition, the relative unit parts, based on weight, are shown. Molar percentages (mol. %) and weight percentages (wt. %) for each reactive ingredient are provided, except that mol. % values of less than 0.01 are not provided. The mol. % and wt. % of a given component are relative to the total moles and weight, respectively, of all reactive components in the composition prior to initiation of curing.

TABLE 1

| Abbreviation | Compound | Molecular Wt |
|---|---|---|
| Si-1 | Formula I above wherein $R^1$ is a butyl group, $R^2$ is hydrogen, $R^3$ is a methyl group, m = 4, and n = 1 | 583 |
| Si-2 | A compound of formula II above wherein $R^1$ and $R^2$ are methyl groups, m is 0, n represents an integer from X to Y, a represents an integer of X to Y, and b represent an integer of X to Y | 9,300 |
| Si-3 | Methacryloxypropyl terminated polydimethylsiloxane | 4,500 |
| AE | 2-Allyloxy ethanol | 102 |
| BVE | 4-butanediol vinyl ether | 116 |
| DEGVE | diethylene glycol vinyl ether | 132 |
| EGDMA | ethylene glycol dimethacrylate | 198 |
| EGMA | ethylene glycol methyl ether methacrylate | 144 |
| EGVE | ethylene glycol vinyl ether | 88 |
| MMA | methyl methacrylate | 100 |
| UV2 | 2-(3-(2H-benzotriazol-2-YL)-4-hydroxy-phenyl) ethyl methacrylate (CAS no. 96478-0-0) | 323 |
| pTPP | Diphenyl (P-vinylphenyl)phosphine (CAS no. 40538-11-2) | 288 |
| RBT1 | 2-Propenoic acid,2-methyl-,1,1'-[(9,10-dihydro-9,10-dioxo-1,4-anthracenediyl)bis(imino-2,1-ethanediyl)]ester (CAS no. 121888-69-5) | |
| TEGDMA | triethylene glycol dimethacrylate | 286 |
| TEGDVE | triethyleneglycol divinyl ether | 202 |
| V-64 | 2,2'-Azobis-2-methyl propanenitrile | |
| VMA | N-vinyl-N-methylacetamide | 99 |

Example 1

Silicone Hydrogel Contact Lens Fabrication

The chemical compounds listed in the tables in Examples 2-9 were weighed and mixed together to form polymerizable compositions. Each polymerizable composition was filtered using a 0.2-5.0 micron filter and stored for up to about 2 weeks at 2-10° C. prior to cast molding and curing.

The polymerizable composition was cast molded by placing a volume of the composition on a female mold member and fitting a male mold member thereon to form a contact lens mold assembly. The female and male mold members were made from a non-polar resin (e.g. polypropylene). The polymerizable composition was thermally cured to form a polymeric lens body by placing the mold assembly in a nitrogen oven at the following cycle: 30 min. N$_2$ purging at room temperature, 40 min. at 55° or 65° C., 40 min. at 80° C., and 40 min. at 100° C.

After curing, the male and female mold members were dry demolded and the polymeric lens bodies were dry delensed from the male mold members. The delensed polymeric lens bodies were transferred to individual wells of a washing tray containing DI water and Tween 80 (washing solution). After several minutes, the washing solution was aspirated, and the wells refilled with washing solution; this step was repeated 1-2 times. The extracted and hydrated lenses were placed into blister packages containing a buffered packaging solution, and the packages were sealed and autoclaved.

Example 2

Formulation 1

The polymerizable composition designated Formulation 1 shown in Table 2 was used to make contact lenses using the methods described in Example 1. The composition had the following approximate molar ratios: a 17:1 molar ratio of vinyl amide-containing monomer to vinyl ether-containing monomer; and a 61:1 molar ratio of monofunctional acrylate-containing siloxane monomer to bifunctional acrylate-containing siloxane monomer.

TABLE 2

| Abbreviation | Unit Amount | Mol. % | Wt. % |
|---|---|---|---|
| Si-1 | 32 | 7.9 | 30.9 |
| Si-3 | 4 | 0.13 | 3.9 |
| VMA | 45 | 64.0 | 43.5 |
| MMA | 13 | 18.6 | 12.6 |
| EGMA | 3 | 3.0 | 2.9 |
| BVE | 3 | 3.7 | 2.9 |
| TEGDMA | 1 | 0.50 | 0.97 |
| TEGDVE | 0.2 | 0.14 | 0.19 |
| pTPP | 0.5 | 0.25 | 0.48 |
| V-64 | 0.5 | 0.43 | 0.48 |
| RBT1 | 0.01 | | 0.01 |
| UV2 | 1.3 | 0.40 | 1.3 |

Silicone hydrogel contact lenses made from this formulation had an EWC of about 57%, a modulus of about 0.70 MPa, an energy loss of about 40%, and a captive bubble dynamic advancing contact angle of from about 50 to about 60 degrees.

Example 3

Formulation 2

The polymerizable composition designated Formulation 2 shown in Table 3 was used to make contact lenses using the methods described in Example 1. The composition had the following approximate molar ratios: a 7:1 molar ratio of hydrophilic vinyl amide-containing monomer to vinyl ether-containing monomer; and a 40:1 molar ratio of monofunctional acrylate-containing siloxane monomer to bifunctional acrylate-containing siloxane monomer.

TABLE 3

| Abbreviation | Unit Amount | Mol. % | Wt. % |
|---|---|---|---|
| Si-1 | 26 | 6.6 | 25.1 |
| Si-2 | 10 | 0.16 | 9.6 |
| VMA | 40 | 59.5 | 38.6 |
| MMA | 12 | 17.7 | 11.6 |
| EGMA | 5 | 5.1 | 4.8 |
| BVE | 7 | 8.9 | 6.8 |
| TEGDMA | 1.2 | 0.62 | 1.2 |
| TEGDVE | 0.2 | 0.15 | 0.19 |
| pTPP | 0.5 | 0.28 | 0.48 |
| Vazo64 | 0.5 | 0.45 | 0.48 |
| RB 247 | 0.01 | | 0.01 |
| UV2 | 1.3 | 0.59 | 1.3 |

Silicone hydrogel contact lenses made from this formulation had an EWC of about 56%, a modulus of about 0.50 MPa, and a captive bubble dynamic advancing contact angle of about 47 to about 51 degrees.

Example 4

Formulation 3

The polymerizable composition designated Formulation 3 shown in Table 4 was used to make contact lenses using the methods described in Example 1. The composition had the following approximate molar ratios: a 16:1 molar ratio of hydrophilic vinyl amide-containing monomer to vinyl ether-containing monomer; and a 41:1 molar ratio of monofunctional acrylate-containing siloxane monomer to bifunctional acrylate-containing siloxane monomer.

TABLE 4

| Abbreviation | Unit Amount | Mol. % | Wt. % |
|---|---|---|---|
| Si-1 | 26 | 7.0 | 26.3 |
| Si-2 | 10 | 0.17 | 10.1 |
| VMA | 40 | 62.9 | 40.4 |
| MMA | 12 | 18.7 | 12.1 |
| EGMA | 5 | 5.4 | 5.1 |
| BVE | 3 | 4.0 | 3.0 |
| EGDMA | 0.5 | 0.39 | 0.51 |
| TEGDVE | 0.1 | 0.08 | 0.10 |
| pTPP | 0.5 | 0.27 | 0.51 |
| V-64 | 0.5 | 0.47 | 1.3 |
| UV2 | 1.3 | 0.63 | 0.01 |
| RBT1 | 0.01 | | 0.51 |

Silicone hydrogel contact lenses made from this formulation had an EWC of about 55%, a modulus of about 0.60 MPa, and a captive bubble dynamic advancing contact angle of from about 47 to about 55 degrees.

Example 5

Formulation 4

The polymerizable composition designated Formulation 4 shown in Table 5 was used to make contact lenses using the methods described in Example 1. The composition had the following approximate molar ratios: an 8:1 molar ratio of hydrophilic vinyl amide-containing monomer to vinyl ether-containing monomer; and a 56:1 molar ratio of monofunctional acrylate-containing siloxane monomer to bifunctional acrylate-containing siloxane monomer.

TABLE 5

| Abbreviation | Unit Amount | Mol. % | Wt. % |
|---|---|---|---|
| Si-1 | 29 | 7.1 | 28.3 |
| Si-2 | 8 | 0.12 | 7.8 |
| VMA | 44 | 63.3 | 42.9 |
| MMA | 14 | 19.9 | 13.7 |
| EGVE | 5 | 8.1 | 4.9 |
| EGDMA | 0.6 | 0.43 | 0.59 |
| TEGDVE | 0.15 | 0.11 | 0.15 |
| V-64 | 0.5 | 0.43 | 0.49 |
| UV2 | 1.3 | 0.57 | 1.3 |
| RBT1 | 0.01 | | 0.01 |

Silicone hydrogel contact lenses made from this formulation had an EWC of about 56%, and a modulus of about 0.65 MPa.

Example 6

Formulation 5

The polymerizable composition designated Formulation 5 shown in Table 6 was used to make contact lenses using the methods described in Example 1. The composition had the following approximate molar ratios: an 8:1 molar ratio of hydrophilic vinyl amide-containing monomer to vinyl ether-containing monomer; and a 58:1 molar ratio of monofunctional acrylate-containing siloxane monomer to bifunctional acrylate-containing siloxane monomer.

TABLE 6

| Abbreviation | Unit Amount | Mol. % | Wt. % |
|---|---|---|---|
| Si-1 | 29 | 7.5 | 27.9 |
| Si-2 | 8 | 0.13 | 7.7 |
| VMA | 42 | 63.6 | 40.5 |
| MMA | 8 | 12.0 | 7.7 |
| EGMA | 6 | 6.3 | 5.8 |
| DEGVE | 7 | 8.0 | 6.7 |
| EGDMA | 0.6 | 0.45 | 0.58 |
| TEGDVE | 0.1 | 0.07 | 0.10 |
| pTPP | 0.5 | 0.26 | 0.48 |
| AE | 0.4 | 0.59 | 0.39 |
| V-64 | 0.5 | 0.46 | 0.48 |
| UV2 | 1.7 | 0.79 | 1.6 |
| RBT1 | 0.01 | | 0.01 |

Silicone hydrogel contact lenses made from this formulation had an EWC of from 57% to 58%, a modulus of about 0.7 MPa, a tensile strength of about 1.5 MPa, a captive bubble dynamic advancing contact angle of from about 44 to about 48 degrees, a wet extractable component of about 5.1%, an ionoflux of about $2.9 \times 10^{-3}$ mm$^2$/min, and an energy loss from about 32% to about 33%.

Example 7

Formula 6

The polymerizable composition designated Formulation 6 shown in Table 7 was used to make contact lenses using the methods described in Example 1. The composition had the following approximate molar ratios: a 5:1 molar ratio of hydrophilic vinyl amide-containing monomer to vinyl ether-containing monomer; and a 68:1 molar ratio of monofunctional acrylate-containing siloxane monomer to bifunctional acrylate-containing siloxane monomer.

TABLE 7

| Abbreviation | Unit Amount | Mol. % | Wt. % |
|---|---|---|---|
| Si-1 | 30 | 6.9 | 26.7 |
| Si-2 | 7 | 0.10 | 6.2 |
| VMA | 44 | 59.9 | 39.1 |
| MMA | 8 | 10.8 | 7.1 |
| EGMA | 6 | 5.6 | 5.3 |
| DEGVE | 10 | 10.2 | 8.9 |
| BVE | 4 | 4.6 | 3.6 |
| EGDMA | 0.6 | 0.41 | 0.53 |
| TEGDVE | 0.1 | 0.05 | 0.09 |
| pTPP | 0.5 | 0.26 | 0.44 |
| V-64 | 0.5 | 0.41 | 0.44 |
| RBT1 | 0.01 | | 0.01 |
| UV2 | 1.8 | 0.75 | 1.6 |

Silicone hydrogel contact lenses made from this formulation had acceptable dimensional stability, an EWC of about 61%, a modulus of about 0.5 MPa, a tensile strength of about 1.2 MPa, a captive bubble dynamic advancing contact angle of from about 45 to about 47 degrees, a wet extractable component of about 4.55%, an ionoflux of about $3.8 \times 10^{-3}$ mm$^2$/min, and an energy loss of from about 30% to about 33%.

Example 8

Formulation 7

The polymerizable composition designated Formulation 7 shown in Table 8 was used to make contact lenses using the methods described in Example 1. The composition had the following approximate molar ratios: a 7:1 molar ratio of hydrophilic vinyl amide-containing monomer to vinyl ether-containing monomer; and a 68:1 molar ratio of monofunctional acrylate-containing siloxane monomer to bifunctional acrylate-containing siloxane monomer.

TABLE 8

| Abbreviation | Unit Amount | Mol. % | Wt. % |
|---|---|---|---|
| Si-1 | 30 | 7.07 | 27.4 |
| Si-2 | 7 | 0.10 | 6.4 |
| VMA | 45 | 62.5 | 41.1 |
| MMA | 12 | 16.5 | 11.0 |
| EGMA | 6 | 5.7 | 5.5 |
| BVE | 5 | 5.9 | 4.6 |
| TEGDMA | 1.4 | 0.67 | 1.3 |
| TEGDVE | 0.2 | 0.14 | 0.18 |
| pTPP | 0.5 | 0.24 | 0.46 |
| V-64 | 0.5 | 0.42 | 0.46 |
| RBT1 | 0.01 | | 0.01 |
| UV2 | 1.8 | 0.76 | 1.7 |

Silicone hydrogel contact lenses made from this formulation had acceptable dimensional stability, an EWC of from about 55% to about 57%, a modulus of about 0.7 MPa, a tensile strength of about 1.3 MPa, a captive bubble dynamic advancing contact angle of from about 47 to about 53 degrees, a wet extractable component of about 4.1%, an ionoflux of about $3.6 \times 10^{-3}$ mm$^2$/min, and an energy loss of from about 34% to about 35%.

Example 9

Formulation 8

The polymerizable composition designated Formulation 8 shown in Table 9 was used to make contact lenses using the methods described in Example 1. The composition had the following approximate molar ratios: a 7:1 molar ratio of hydrophilic vinyl amide-containing monomer to vinyl ether-containing monomer; and a 41:1 molar ratio of monofunctional acrylate-containing siloxane monomer to bifunctional acrylate-containing siloxane monomer.

TABLE 9

| Abbreviation | Unit Amount | Mol. % | Wt. % |
|---|---|---|---|
| Si-1 | 25.2 | 7.04 | 25.2 |
| Si-2 | 9.7 | 0.17 | 9.7 |
| VMA | 38.8 | 63.9 | 38.8 |
| BVE | 6.8 | 9.6 | 6.8 |
| EGMA | 4.8 | 5.4 | 4.8 |
| EOEMA | 11.6 | 12.0 | 11.6 |
| TEGDMA | 1.2 | 0.68 | 1.2 |
| TEGDVE | 0.1 | 0.08 | 0.10 |
| V-64 | 0.5 | 0.50 | 0.50 |
| UV2 | 0.9 | 0.45 | 0.90 |
| RBT1 | 0.01 | | 0.01 |
| pTPP | 0.5 | 0.28 | 0.50 |

Silicone hydrogel contact lenses made from this formulation had an EWC of about 56%, a modulus of about 0.57 MPa, a tensile strength of about 1.90 MPa, a wet extractable component of about 4.74%, and an energy loss of about 34 to 36%.

Example 10

Formulation 9

A polymerizable lens composition, designated Formulation 9 shown in Table 10 below was prepared by mixing the ingredients listed, where FMM is an acrylate-containing siloxane monomer having a molecular weight of about 1,500 and represented by formula (III) above; M5A is a silicone-containing component the same as, or similar in structure to, hydrophilic polysiloxane macromonomer A described in Example 2 of U.S. Patent Application Publication No. 2009/0234089 (Asahi Kasei Aime Co., Ltd., Kanagawa, Japan); and EHMA is 2-ethylhexyl methacrylate.

The lens formulation was formed into lenses in the following general manner. Contact lens molds were injection molded from non-polar polypropylene resin using conventional injection molding techniques and equipment. Each contact lens mold included a female mold member that includes a concave optical quality surface for forming the front surface of the contact lens, and a male mold member that includes a convex optical quality surface for forming the back surface of the contact lens. The female mold member can be understood to be a front surface mold, and the male mold member can be understood to be a back surface mold.

An amount (about 60 μl) of the polymerizable lens composition was placed on the concave surface of the female mold member. The male mold member was placed in contact with the female mold member such that the polymerizable lens composition was located in a contact lens shaped cavity formed between the concave surface of the female mold member and the convex surface of the male mold member. The male mold member was held in position by an interference fit between a peripheral region of the female and male mold members.

The contact lens mold containing the polymerizable lens composition was then placed in an oven where the polymerizable lens composition was cured at a temperature of about 100° C. for about 30 minutes. After curing, the contact lens mold contained a polymerized contact lens product within the contact lens shaped cavity.

The contact lens mold was removed from the oven and allowed to cool to room temperature (about 20° C.). The contact lens mold was mechanically demolded to separate the male and female mold members from each other. The polymerized contact lens product remained attached to the male mold member. The polymerized contact lens product was then mechanically delensed from the male mold member to separate the contact lens product from the male mold member. The separated contact lens product was then washed in water, hydrated in PBS.

TABLE 10

| Abbreviation | Unit Amount |
|---|---|
| FMM | 30 |
| M5A | 15 |
| VMA | 45 |
| MMA | 12 |
| EHMA | 2 |
| BVE | 6 |
| TEGDMA | 0.15 |
| TEGDVE | 0.1 |
| V-64 | 0.5 |

In one example, the polymerizable composition of the invention does not comprise a siloxane monomer represented by formula (III) above, where n is an integer from about 10 to 15. In another example, the polymerizable composition of the invention does not comprise EHMA. In yet a another example, the polymerziable composition of the invention does not include Formulation 9.

Although the disclosure herein refers to certain illustrated examples, it is to be understood that these examples are presented by way of example and not by way of limitation. The intent of the foregoing detailed description, although discussing exemplary examples, is to be construed to cover all modifications, alternatives, and equivalents of the examples as may fall within the spirit and scope of the invention as defined by the additional disclosure.

A number of publications and patents have been cited hereinabove. Each of the cited publications and patents are hereby incorporated by reference in their entireties.

What is claimed is:

1. A silicone hydrogel contact lens comprising:
   a polymeric lens body that is a reaction product of a polymerizable composition comprising
   a) at least one hydrophilic vinyl amide-containing monomer;
   b) at least one acrylate-containing siloxane monomer; and
   c) at least one vinyl ether-containing monomer, with the proviso that the at least one acrylate-containing siloxane monomer does not comprise a siloxane monomer represented by formula (III),

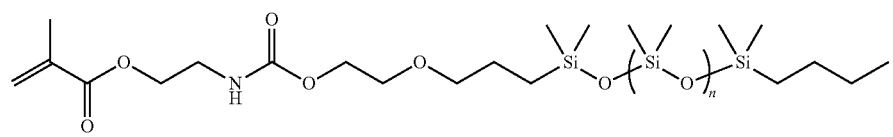

(III)

where n is an integer from about 10 to 15.

2. The contact lens of claim 1, wherein the polymerizable composition has a total amount of hydrophilic vinyl amide-containing monomer of from about 50 mol. % to about 80 mol. %.

3. The contact lens of claim 1, wherein the polymerizable composition has a total amount of acrylate-containing siloxane monomer of from about 2 mol. % to about 15 mol. %.

4. The contact lens of claim 2, wherein the polymerizable composition has a total amount of vinyl ether-containing monomer of from about 2 mol. % to about 20 mol. %.

5. The contact lens of claim 1, wherein the polymerizable composition has a molar ratio of total amount of hydrophilic vinyl amide-containing monomer to total amount of vinyl ether-containing monomer of from 2:1 to 30:1, respectively.

6. The contact lens of claim 1, wherein the polymerizable composition has a molar ratio of total amount of hydrophilic vinyl amide-containing monomer to total amount of vinyl ether-containing monomer of from 4:1 to 20:1, respectively.

7. The contact lens of claim 1, wherein the at least one hydrophilic vinyl amide-containing monomer is selected from N-vinyl-N-methyl acetamide (VMA), or N-vinyl pyrrolidone (NVP), or a combination thereof.

8. The contact lens of claim 1, wherein the at least one hydrophilic vinyl amide-containing monomer consists of N-vinyl-N-methyl acetamide (VMA).

9. The contact lens of claim 1, wherein the at least one vinyl ether-containing monomer is selected from 1,4-butanediol vinyl ether (BVE), or ethylene glycol vinyl ether (EGVE), or diethylene glycol vinyl ether (DEGVE), or 1,4-cyclohexanedimethanol vinyl ether (CHDMVE), or a poly(ethylene glycol) vinyl ether having from 4 to 10 ethylene glycol units, or a poly(ethylene glycol) vinyl ether having more than 10 ethylene glycol units, or any combination thereof.

10. The contact lens of claim 1, wherein the polymerizable composition further comprises at least one vinyl-containing cross-linking agent.

11. The contact lens of claim 10, wherein the polymerizable composition has a total amount vinyl-containing cross-linking agent of from about 0.02 mol. % to about 0.20 mol. %.

12. The contact lens of claim 10, wherein the at least one vinyl-containing cross-linking agent is selected from divinyl ether, or divinyl sulfone, or triallyl phthalate, or triallyl isocyanurate, or diallyl phthalate, or diethyleneglycol divinyl ether, or triethyleneglycol divinyl ether, or any combination thereof.

13. The contact lens of claim 10, wherein the at least one vinyl-containing cross-linking agent comprises a divinyl ether.

14. The contact lens of claim 1, wherein the polymerizable composition further comprises at least one acrylate-containing monomer.

15. The contact lens of claim 1, wherein the polymerizable composition is substantially free of hydrophilic polymer.

16. The contact lens of claim 1 that is free of post-polymerization surface modification.

17. The contact lens of claim 1 sterilized in a sealed package.

18. A method of manufacturing the silicone hydrogel contact lens of claim 1 comprising:
polymerizing the polymerizable composition to make the polymeric lens body, and washing the polymeric lens body with a washing liquid to remove unreacted or partially reacted components from the polymeric lens body.

* * * * *